United States Patent [19]

Dwyer

[11] 3,996,865
[45] Dec. 14, 1976

[54] SHOTSHELL WITH SEED CAPSULE

[76] Inventor: Vernon Thomas Dwyer, 931 Twin Pine Drive, Des Peres, Mo. 63131

[22] Filed: June 20, 1975

[21] Appl. No.: 588,685

Related U.S. Application Data

[63] Continuation-in-part of Ser. No. 488,169, July 12, 1974, abandoned.

[52] U.S. Cl. .............................. 47/1 R; 102/42 R; 111/DIG. 1; 111/1
[51] Int. Cl.² ............................................ A01C 1/00
[58] Field of Search ................... 102/42 R, 92; 111/DIG. 1, 1; 147/58, 1, 57.5

[56] References Cited
UNITED STATES PATENTS

| | | | |
|---|---|---|---|
| 1,917,118 | 7/1933 | Hislop | 102/42 R |
| 2,660,002 | 11/1953 | Farley | 47/1 |
| 3,027,621 | 4/1962 | Clark, Jr. | 102/42 R |

FOREIGN PATENTS OR APPLICATIONS 27,973  2/1909  Norway ............................... 102/92

OTHER PUBLICATIONS

"Katzenjammer Kids" Comic Section Washington Post, Apr. 22, 1962.

Primary Examiner—Edgar S. Burr
Assistant Examiner—James R. Feyrer
Attorney, Agent, or Firm—Ralph W. Kalish

[57] ABSTRACT

A cartridge for both hunting and seed distributing purposes comprising a cylindrical casing having a primer, a propellant charge ignitable upon firing of said primer, spaced-apart wads above said propellant charge defining a load-receiving volume therebetween, a load of plant seeds received within a capsule disposed within said volume; a multi-missile shot charge provided above said volume and means for enclosing the normally forward end of said cartridge.

7 Claims, 1 Drawing Figure

U.S. Patent    Dec. 14, 1976    3,996,865
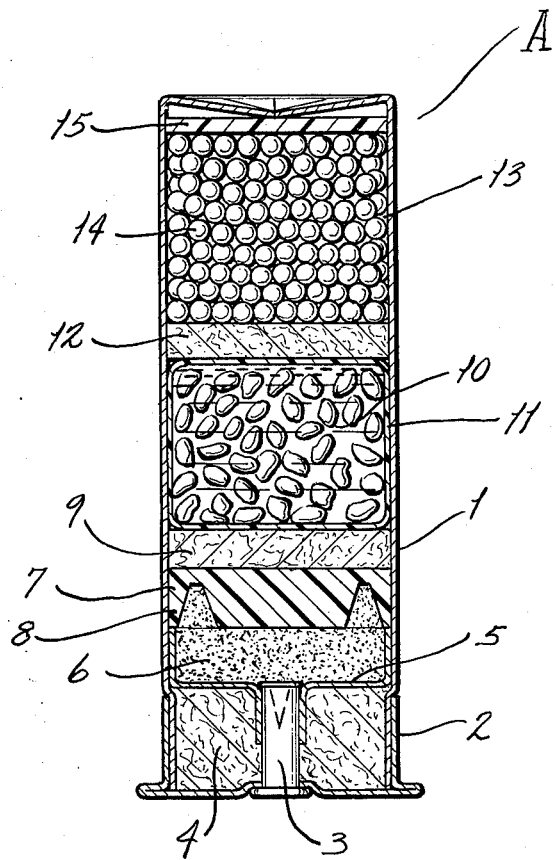

SHOTSHELL WITH SEED CAPSULE

BACKGROUND AND SUMMARY OF THE INVENTION

This invention relates in general to the broad field of shotgun cartridges and, more particularly, to cartridges provided with a quantity of germinative seeds. This is a continuation-in-part of my co-pending application Ser. No. 488,169 filed July 12, 1974 now abandoned.

Heretofore various efforts have been undertaken in the general field of horticulture to utilize the propellant charge of a shotshell or shotgun cartridge for distribution of plant nutrients, and pollen for fertilization of fruit and nut bearing trees, and the like. However, each of such attempts have replaced the normal shot charge of the cartridge with such nutrients or pollen so that the resultant cartridge is useful for but its single intended horticultural purpose. Reference may be made to the Farley Patents, U.S. Pat. Nos. 2,660,002 and 2,660,003 wherein the disclosed cartridge incorporates the pollinating charge within that portion of the shell which would normally contain the shot charge. In each instance the pollen is intermixed with a suitable quantity of an appropriate carrier which conduces to the distribution and constitutes the major portion of the particular charge. Another earlier effort is demonstrated by the Simmons U.S. Pat. No. 3,069,809 wherein the normally shot-containing chamber of the shell is filled with the particular plant nutrient or combination of nutrients which may be of solid or particulate character and wherein it was asserted that the power of the explosion of the propellant would tend to force the nutrients into plants without damage to such plants. Simmons also suggested nutrients in liquid form as encased within a tissue-thin rubber sack which was intended to rupture to allow the contained liquid to penetrate the plant. In each of the prior art efforts, there has been the necessity of incorporating a ballast for the particular charge. But to the present time, one has not developed a shotgun cartridge which concurrently is capable of being used for its intended purpose, as for hunting game, as well as for botanical purposes.

Therefore, it is an object of the present invention to provide a shot shell which incorporates a conventional shot charge, as well as a predetermined load of seed, whereby the shell may be used for customary hunting purposes as well as for simultaneously discharging seed for germinating purposes.

It is another object of the present invention to provide a shot shell of the character stated which may be of conventional character and readily loaded with a predetermined quantity of seed by the individual reloader.

It is another object of the present invention to provide a shot shell of the character stated wherein the components are so arranged that the discharged seed is in no way damaged or adversely affected by the burning of the powder or gases of explosion so that the same are capable of germination.

It is a further object of the present invention to provide a shot shell of the character stated wherein the seeds are retained within a water soluble sack or capsule so as to be restrained against indiscriminate dispersal upon firing and thereby be maintained for ultimate effective plant growth.

It is a still further object of the present invention to provide a shot shell incorporating a seed charge which may be most economically produced; does not entail modification of the shotgun cartridge embodying the normal components thereof; and which shell in usage is fully capable of accomplishing its dual purpose.

DESCRIPTION OF THE DRAWING

The FIGURE is a vertical sectional view of a shot shell constructed in accordance with and embodying the present invention.

DESCRIPTION OF THE PREFERRED EMBODIMENT

Referring now by reference characters to the drawing which illustrates the preferred embodiment of the present invention, A designates a shotgun shell or cartridge having the usual tubular body 1 fabricated of paper, plastic, metal or the like and having a suitably encased base, as at 2. Mounted within the base is a conventional primer 3 received within a base wad 4 which may, if desired, incorporate a base wad overlay 5; it being recognized that the latter is not critical to the present invention.

Provided above primer 3 is a propellant charge 6 and in immediate overlying relationship to said latter is an obturating wad 7 which is shown as incorporating a peripheral skirt 8. Provided above obturating wad 7 may be one or more filler or separator wads 9, fabricated of any suitable material, such as felt, pulp, or the like. Disposed upon filler wad 9 is a predetermined quantity or load of seed 10 encased within a thin-walled container or capsule 11 fabricated of a water soluble or moisture-rupturable material, such as gelatin, of the type which has found wide usage for medicinal capsules. Superimposed upon seed load 10 is a top filler wad 12, as of like character as wad 9, and with said wad 12 cooperating with the upper portion of body 1 to define a chamber 13 for a shot charge 14, as of multi-missile character, and being the usual type of shot for customary shotgun usage. A sealing or card wad 15 defines the upper limit of chamber 13 and with the upper end of shell A being closed in any well known manner, as by infolding of body 1, crimping, etc.

Although not of extreme criticality, it has been found that the seed load 10 may be of substantially like volume as the shot charge 14. However, it is recognized that the amount of seed may be obviously varied, as well as that of the shot charge and the amount of propellant charge depending upon the individual requirements of the reloaders.

The present invention is adapted for shotgun shell casings having gages extending throughout the gamut of gages presently available. With larger gages a single complementary seed load 10 could be utilized or, if desired, the seed load may be provided within a plurality of discrete, capsule units.

It is to be observed that seed load 10 is sandwiched between the shot charge and the propellant and being separated therefrom by one or more wads on either side. The number of wads utilized will, of course, be dependent upon the available types and the characteristics of the selected loading of the cartridge.

In actual practice, it has been clearly established that upon firing of cartridge A, seed load 10 has been sufficiently insulated so as not to be damaged or destroyed by the combustion of the powder charge, nor caused any interference with the dispersal of the shot so that the same may effect its designed pattern.

In usage, it will be seen that upon firing of cartridge A seed load 10 and shot charge 14 will be moved down the barrel of the firearm toward the muzzle and with the gases of explosion, on expanding, exerting an outward pressure upon skirt 8 to force same into sealing engagement with the gun barrel and thereby preventing gas leakage and concurrently coacting with filler wad 9 to prevent contact of such gases with seed load 10.

As stated above, shot 14 will upon emission from the firearm muzzle expand into its predetermined pattern and seed load 10 will follow its intended trajectory in fully integrated unitary character, with the gelatinous casing 11 unbroken. Thus, while the shot 14 travels toward the particular target of the firearm operator, seed load 10 will ultimately come to rest upon the ground for ultimate dissolution of casing 11 whereby the seeds 10 will be brought into contact with the soil for germination and ultimate plant growth. Experience has demonstrated conclusively that seed load 10 retains its germinating potential despite the firing of cartridge A. The loads 10 within their casing 11 have been retrieved, opened, and the seeds planted in an ordinary flower pot permitting of continual inspection. Within approximately one week such seeds germinated and growth of the plant commenced. Thus, the unique manner of disposing of the seed load within cartridge A has preserved the germinative potential of the seeds while simultaneously permitting the user to fire at any selected target, such as game or the like.

Therefore, the present invention brings about a duality of objects in permitting retention of the usual shotgun purpose, as well as providing for distribution of seed charges for ultimate plant replenishment as well as, conceivably, providing a limited source of nourishment to animals.

Seeds of all types may be utilized within the load 10 and evidentiary of this is the fact that milo seeds, cereal grass seeds, such as millet, sunflower seeds, and wheat seeds have all been utilized in actual practice and have been demonstrated to retain their viability.

Having described my invention what I claim and desire to obtain by Letters Patent is:

1. A cartridge comprising means defining a tubular casing, primer means located in one end portion of said casing, a propellant charge disposed above said primer means, first and second spaced apart wad means located overlyingly of said propellant charge for defining a first compartment, a load of viable ingredients comprising germinative seeds provided in said first compartment, means enclosing said casing at its end remote from said primer means and spacedly above said second wad means to cooperate therewith for defining a second chamber, and a multi-missile charge disposed in said second chamber.

2. A cartridge as defined in claim 1 and further characterized by means encasing said germinative seed load.

3. A cartridge as defined in claim 2 and further characterized by said encasing means comprising a thin-walled capsule.

4. A cartridge as defined in claim 3 and further characterized by said capsule being constructed of water soluble material.

5. A cartridge as defined in claim 4 and further characterized by said multi-missile charge comprising discrete metallic shot elements.

6. A cartridge comprising means defining a tubular casing, primer means located in one end portion of said casing, a propellant charge disposed above said primer means, an obturating wad located overlyingly of said propellant charge, a first filler wad superimposed upon said obturating wad, a second filler was provided within said casing in axially spaced apart relationship to said first filler wad for defining therewith and with the intervening portion of said casing a first compartment, a predetermined load of viable ingredients comprising germinative seeds provided within said first compartment, means enclosing said casing at its end remote from said primer means and spacedly from said second filler wad to cooperate with the latter and intervening portion of said casing to define a second chamber, and a multi-missile shot charge disposed in said second chamber.

7. A cartridge as defined in claim 6 and further characterized by said load of viable ingredients comprising germinative seeds being incapsulated by water soluble material.

* * * * *